US012560094B2

(12) United States Patent
Power

(10) Patent No.: US 12,560,094 B2
(45) Date of Patent: Feb. 24, 2026

(54) AXIAL COMPRESSOR STATOR

(71) Applicant: RAYTHEON TECHNOLOGIES CORPORATION, Farmington, CT (US)

(72) Inventor: Bronwyn Power, New Haven, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/960,514

(22) Filed: Oct. 5, 2022

(65) Prior Publication Data

US 2024/0125241 A1 Apr. 18, 2024

(51) Int. Cl.
*F01D 9/04* (2006.01)

(52) U.S. Cl.
CPC .......... *F01D 9/041* (2013.01); *F05D 2220/32* (2013.01); *F05D 2240/12* (2013.01)

(58) Field of Classification Search
CPC .......... F01D 9/041; F01D 5/141; F01D 5/145; F01D 5/148; F05D 2220/32; F05D 2240/12; F05D 2240/122; F05D 2240/123; F05D 2240/124; F05D 2240/301; F05D 2240/305; F05D 2240/306; F04D 29/384; F04D 29/544; F04D 29/681
See application file for complete search history.

(56) References Cited

U.S. PATENT DOCUMENTS

| | | | | |
|---|---|---|---|---|
| 5,460,488 A * | 10/1995 | Spear | F01D 5/22 416/191 |
| 8,029,234 B2 * | 10/2011 | McCaffrey | F01D 25/162 415/142 |
| 8,573,946 B2 | 11/2013 | Power et al. | |
| 10,844,736 B2 * | 11/2020 | Bulot | F01D 9/041 |

(Continued)

FOREIGN PATENT DOCUMENTS

EP 2241722 A1 10/2010

OTHER PUBLICATIONS

NASA.gov, Camber Definition https://www.grc.nasa.gov/WWW/K-12/aerosim/Manual/fsim001t.htm (Year: 2023).*

(Continued)

*Primary Examiner* — Courtney D Heinle
*Assistant Examiner* — Ryan C Clark
(74) *Attorney, Agent, or Firm* — Carlson, Gaskey & Olds, P.C.

(57) ABSTRACT

An airfoil includes a high pressure surface and a low pressure surface that are connected at a leading edge and a trailing edge. The high pressure surface and the low pressure surface extend from a first end to a second end. A camber line extends between the leading edge and the trailing edge and a camber angle is defined as a plurality of camber-angle distributions that extend between the leading edge end and the trailing edge. The plurality of camber-angle distributions include a uniform portion that extends from the leading edge to a forced non-equilibrium boundary layer diffusion (Continued)

(FNBD) feature. The uniform portion includes a non-dimensionalized camber-angle unit that is constant the FNBD feature includes a rapidly increasing camber-angle that is 0.2 non-dimensional camber-angle units higher than the non-dimensionalized camber-angle of the uniform portion.

12 Claims, 6 Drawing Sheets

(56) References Cited

U.S. PATENT DOCUMENTS

| | | | | |
|---|---|---|---|---|
| 10,935,041 | B2 | 3/2021 | Power | |
| 11,280,199 | B2 | 3/2022 | McNamee et al. | |
| 11,326,617 | B2 * | 5/2022 | Greene | F04D 29/366 |
| 2015/0016983 | A1 * | 1/2015 | Power | F01D 25/28 415/208.1 |
| 2016/0230569 | A1 * | 8/2016 | Duelm | F01D 5/282 |
| 2018/0003189 | A1 * | 1/2018 | Power | F04D 29/544 |
| 2018/0252231 | A1 * | 9/2018 | Northall | F04D 29/544 |
| 2018/0283190 | A1 * | 10/2018 | Jaiswal | F01D 9/041 |
| 2019/0063370 | A1 | 2/2019 | Phelps et al. | |
| 2019/0078450 | A1 * | 3/2019 | Eley | F01D 9/041 |
| 2019/0277308 | A1 * | 9/2019 | Nakashima | F04D 29/66 |
| 2019/0345834 | A1 * | 11/2019 | Souverein | F01D 9/041 |
| 2020/0080423 | A1 * | 3/2020 | Hiernaux | F04D 29/681 |
| 2021/0180458 | A1 * | 6/2021 | DiPietro, Jr. | F01D 5/225 |

OTHER PUBLICATIONS

European Search Report for European Application No. 23201949.7 mailed Feb. 27, 2024.

* cited by examiner

AXIAL COMPRESSOR STATOR

STATEMENT REGARDING FEDERALLY SPONSORED RESEARCH OR DEVELOPMENT

The subject of this disclosure was made with government support under Contract No.: N00014-21-C-1003 awarded by the United States Navy. The Government has certain rights in this invention.

TECHNICAL FIELD

The present disclosure relates generally to an airfoil with surfaces that provide forced non-equilibrium boundary layer diffusion.

BACKGROUND

A gas turbine engine may include an axial compressor that provides a pressurized airflow to a combustor. An axial compressor includes stages including a fixed row of airfoils known as stators and rotors including rotating airfoils. Increases in stator loading enable a reduced length of the compressor, a reduction in the number of parts, increases in stage flow and increases in efficiency. High-subsonic inlet Mach-number flow into stator blade rows is a challenge to very high flow capacity designs due to the very low operation incidence range and high loss of the resulting stator.

Turbine engine manufacturers continue to seek further improvements to engine performance including improvements to reduce environmental impact while improving propulsive efficiencies.

SUMMARY

An airfoil according to an exemplary embodiment of this disclosure, among other possible things includes a high pressure surface and a low pressure surface that are connected at a leading edge and a camber line extends between the leading edge and the trailing edge. The camber angle is defined as a plurality of camber-angle distributions that extend between the leading edge end and the trailing edge. The plurality of camber-angle distributions include a uniform portion that extends from the leading edge to a forced non-equilibrium boundary layer diffusion (FNBD) feature. The uniform portion includes a non-dimensionalized camber-angle unit that is constant the FNBD feature includes a rapidly increasing camber-angle that is about 0.2 non-dimensional camber-angle units higher than the non-dimensionalized camber-angle of the uniform portion.

In a further embodiment of the foregoing, the FNBD feature further includes a rapidly decreasing camber-angle that immediately follows the rapidly increasing camber-angle.

In a further embodiment of any of the foregoing, a limit to a smoothness of a camber-angle distribution at a transition from the uniform portion to the rapidly increasing portion and a transition from the rapidly increasing portion to the rapidly decreasing portion are defined as radii that are finite and do not approach zero.

In a further embodiment of any of the foregoing, the rapidly increasing camber angle is located 0.7 non-dimensional axial-cord/arclength units from the leading edge.

In a further embodiment of any of the foregoing, the rapidly increasing camber angle is located between 0.66 and 0.84 non-dimensional axial-chord/arclength units from the leading edge.

In a further embodiment of any of the foregoing, a thickness between the high-pressure surface and the low-pressure surface normal to the camber line is symmetrical about the camber line from the leading edge to the FNBD feature.

In a further embodiment of any of the foregoing, the thickness between the high-pressure surface and the low-pressure surface is at a maximum at a location greater than 10% of a chord length of the airfoil.

In a further embodiment of any of the foregoing, the thickness between the high-pressure surface and the low-pressure surface is at a maximum at a location greater than 66% of a chord length of the airfoil.

In a further embodiment of any of the foregoing, the thickness between the high-pressure surface and the low-pressure surface is at a maximum at a location greater than 75% of a chord length of the airfoil.

In a further embodiment of any of the foregoing, the FNBD feature is disposed at or aft of the location where the thickness is at the maximum.

In a further embodiment of any of the foregoing, the FNBD feature is disposed on one of the low-pressure surface and the high pressure surface.

In a further embodiment of any of the foregoing, the FNBD feature is disposed on the low-pressure surface and a second FNBD feature is disposed on the high-pressure surface.

In a further embodiment of any of the foregoing, the airfoil is part of a compressor rotor blade and/or a compressor stator blade.

In a further embodiment of any of the foregoing, the airfoil is part of a stator of a gas turbine engine.

A turbine engine compressor assembly according to another exemplary embodiment of this disclosure, among other possible things includes a compressor rotor that includes a plurality of rotor blades, and a stator stage that includes a plurality of stator blades. At least one of the plurality of rotor blades and stator blades includes an airfoil. The airfoil includes a high pressure surface and a low pressure surface that are connected at a leading edge and a trailing edge and a camber line that extends between the leading edge and the trailing edge. The camber angle is defined as a plurality of camber-angle distributions that extend from between the leading edge end and the trailing edge. The plurality of camber-angle distributions include a uniform portion that extends from the leading edge to a forced non-equilibrium boundary layer diffusion (FNBD) feature. The uniform portion includes a non-dimensionalized camber-angle unit that is constant the FNBD feature includes a rapidly increasing camber-angle that is about 0.2 non-dimensional camber-angle units higher than the non-dimensionalized camber-angle of the uniform portion.

In a further embodiment of the foregoing, the FNBD feature further includes a rapidly decreasing camber-angle that immediately follows the rapidly increasing camber-angle.

In a further embodiment of any of the foregoing, a limit to a smoothness of a camber-angle distribution at a transition from the uniform portion to the rapidly increasing portion and a transition from the rapidly increasing portion to the rapidly decreasing portion are defined as radii that are finite and do not approach zero.

In a further embodiment of any of the foregoing, a thickness between the high-pressure surface and the low-pressure surface normal to the camber line is symmetrical about the camber line from the leading edge to the FNBD feature.

In a further embodiment of any of the foregoing, the thickness between the high-pressure surface and the low-pressure surface is at a maximum at a location greater than 50% of a chord length of the airfoil and the FNBD feature is located at or aft of the location where the thickness is at the maximum.

In a further embodiment of any of the foregoing, the thickness between the high-pressure surface and the low-pressure surface is at a maximum at a location greater than 66% of a chord length of the airfoil and the FNBD feature is located at or aft of the location where the thickness is at the maximum.

In a further embodiment of any of the foregoing, the thickness between the high-pressure surface and the low-pressure surface is at a maximum at a location greater than 75% of a chord length of the airfoil and the FNBD feature is located at or aft of the location where the thickness is at the maximum.

In a further embodiment of any of the foregoing, the airfoil is part of each of plurality of rotor blades within a blade row with a blade count that is reduced to have a solidity that is approximately 0.75 of that which would be required for an airfoil that does not include the FNBD feature to exhibit a design-point Diffusion Factor of approximately 0.45.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

An example stator blade for an axial compressor includes an airfoil with a profile defined by a novel camber-angle distribution designed in conjunction with the thickness distribution to induce a localized forced non-equilibrium boundary-layer static pressure-rise process. The forced non-equilibrium boundary-layer pressure-rise locally generates excess turbulence production relative to turbulence dissipation in the boundary-layer, enabling the boundary-layer to briefly tolerate a higher local rate of static pressure-rise without separating. The resultant static pressure-rise process (diffusion) induced by the novel combination of geometric features is referred to within this specification as an FNBD process for ease of reference (Forced Non-equilibrium Boundary-layer Diffusion). The necessary combination of novel geometric features is referred to as an FNBD feature. The disclosed profile including an FNBD feature provides for improved axial compressor configurations.

Figure 1:
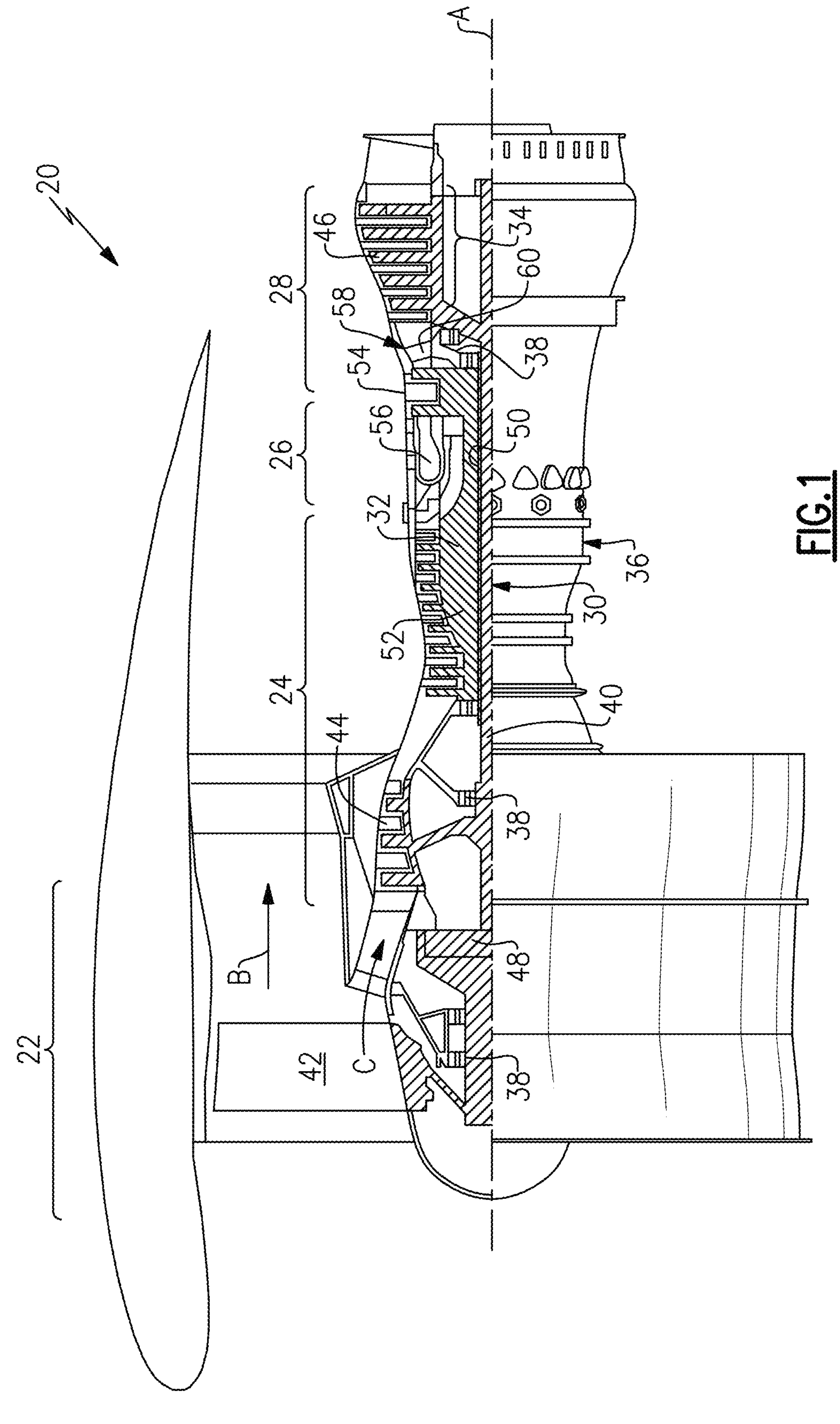
FIG. 1 is a schematic view of an example turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28 The fan section 22 drives air along a bypass flow path B in a bypass duct defined within a nacelle 18, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including single and three-spool architectures.

The exemplary engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low-speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a second (or high) pressure compressor 52 and a second (or high) pressure turbine 54. A combustor 56 is arranged in exemplary gas turbine 20 between the high-pressure compressor 52 and the high-pressure turbine 54. A mid-turbine frame 58 of the engine static structure 36 is arranged generally between the high-pressure turbine 54 and the low-pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 58 includes airfoils 60 which are in the core airflow path C. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
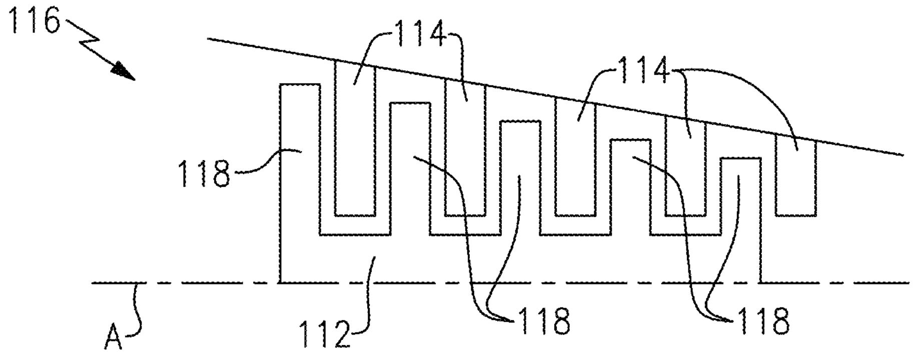
FIG. 2 is schematic view of an axial compressor according to a disclosed example embodiment.
Figure 3:
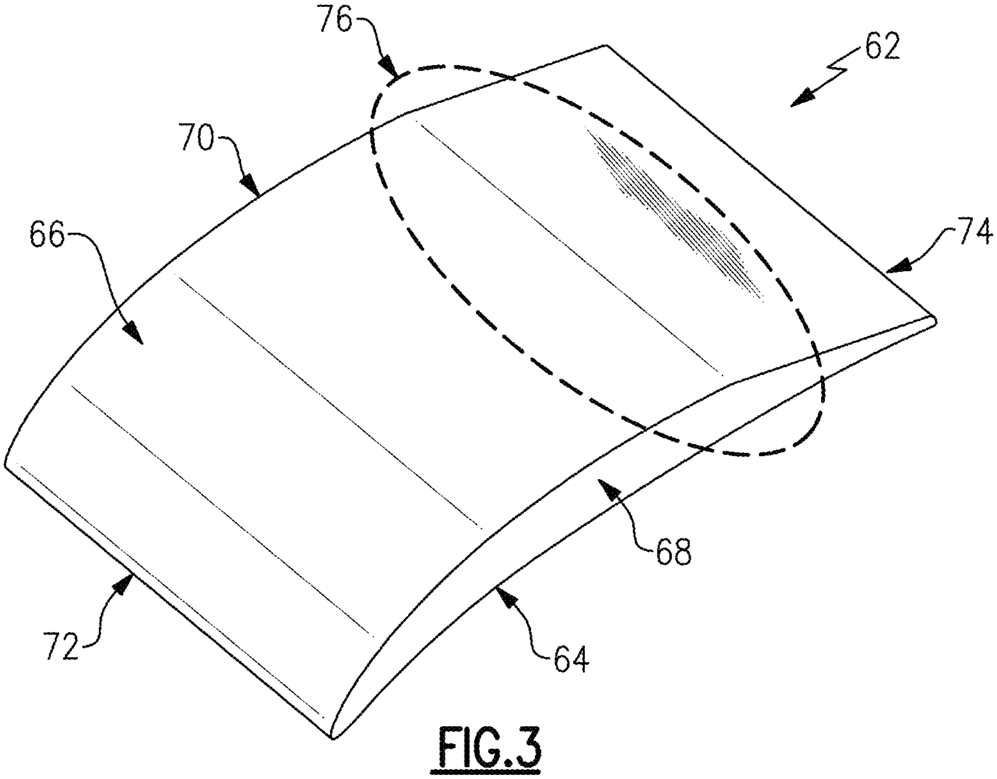
FIG. 3 is perspective view of an example airfoil.

Referring to FIGS. 2 and 3 with continued reference to FIG. 1, an axial compressor section 116 is schematically shown. The axial compressor section 116 includes a compressor rotor 112 with a plurality of rotor blades 118 that rotate relative to a plurality of stator blades 114. The stator blades 114 include an airfoil shape that provides for increased efficiency.

It should be appreciated that both the stator blades 114 and the rotor blades 118 may include features of the disclosed airfoil 62 shown in FIG. 3. Moreover, features of the airfoil 62 may be embodied as a part of a rotor blade, stator blade or guide vane disposed in other areas and sections of the turbine engine 20.

The airfoil 62 includes a low-pressure surface 66 and a high-pressure surface 64 that extend between a leading edge 72 and a trailing edge 74. The low-pressure surface 66 and the high-pressure surface 64 are disposed between a first end 68 and a second end 70. The low-pressure surface 66 and the high-pressure surface 68 may comprise a continuous uninterrupted surface spanning between the first end 68, the second end 70, the leading edge 72 and the trailing edge 74. One or both low-pressure surface 66 and the high-pressure surface 64 may include an FNBD feature 76 located along a chord-wise or mean-camber-line arclength-wise location between the leading edge 72 and the trailing edge 74.

Figure 4:
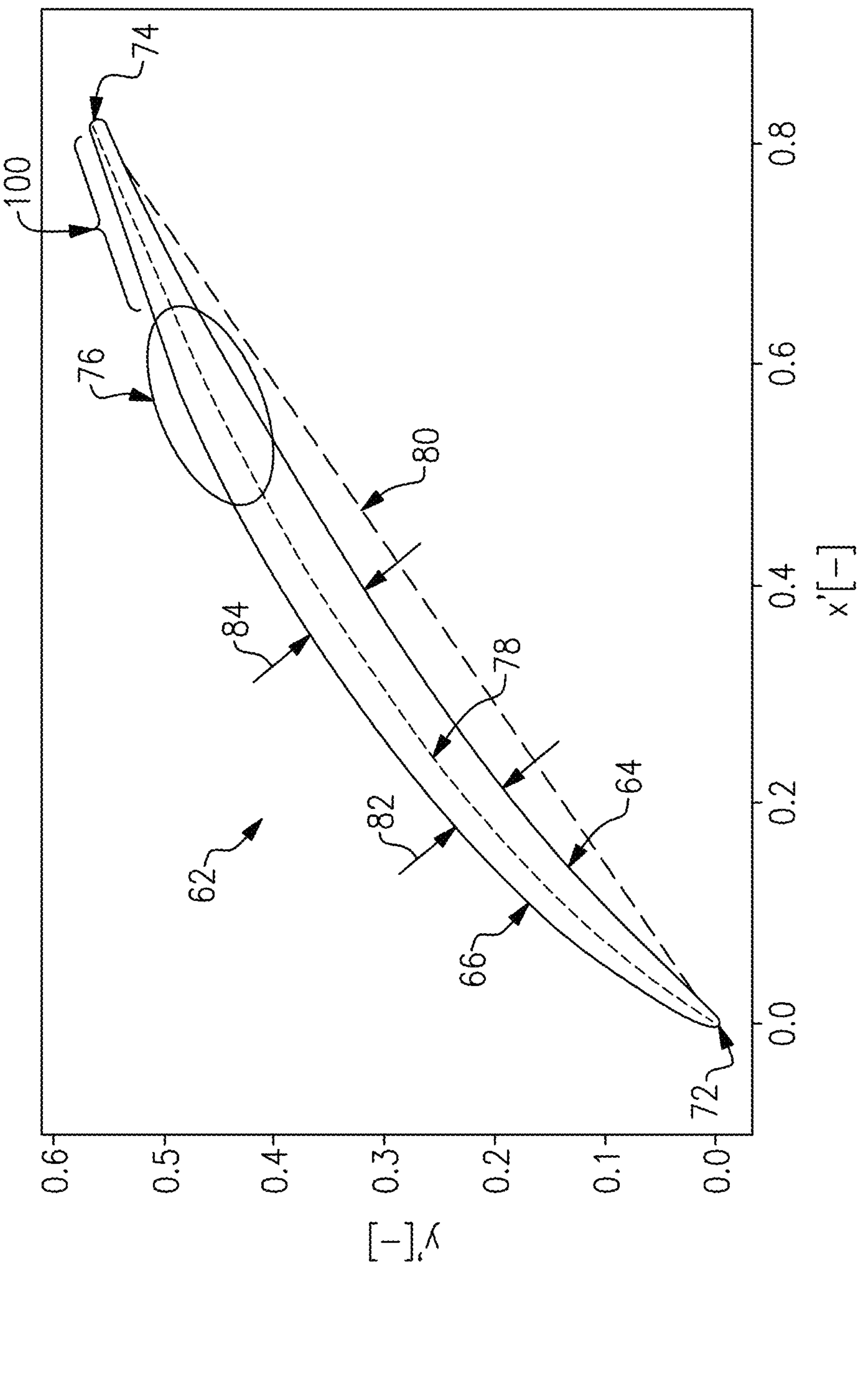
FIG. 4 is a profile view of an example airfoil according to an example disclosed embodiment.

Referring to FIG. 4 with continued reference to FIGS. 1, 2 and 3, the airfoil 62 has a thickness 82 between the low-pressure surface 66 and the high-pressure surface 64 that is normal to a mean camber-line 78. The thickness 82 is symmetrical about the mean camber-line 78 from the leading edge 72 to the FNBD feature 76. In one example embodiment, a maximum thickness 84 is disposed at a location that is greater than 50% of a chord length 80 measured from the leading edge 72.

In one example embodiment, the FNBD feature 76 is located just aft or at the location of the maximum thickness 84. Accordingly, in one example embodiment, the FNBD feature 76 is located at greater than 50% of the chord length 80. In another example embodiment, the maximum thickness 84, and thereby the FNBD feature 76 may be located at a location greater than 66% of the chord length 80 from the leading edge 72. In yet another example embodiment, the maximum thickness 84, and thereby the FNBD feature 76 may be located aft or at a location greater than 75% of the chord length 80 from the leading edge 72. It should be appreciated that the maximum thickness 84 and FNBD feature 76 may be commonly located along the chord length 80 or at different locations.

Moreover, although a single FNBD feature 76 is shown by way of example, more than one FNBD feature 76 maybe provided along the chord length 80 of the airfoil 62. Furthermore, although the example FNBD feature 76 is shown on the low-pressure surface 66, the FNBD feature may be provided on the high-pressure surface 64. Additionally, the FNBD feature 76 may extend from the first end 68 to the second end 70 or may extend for a fraction less than the entire length between the first end 68 and the second end 70.

Figure 5:
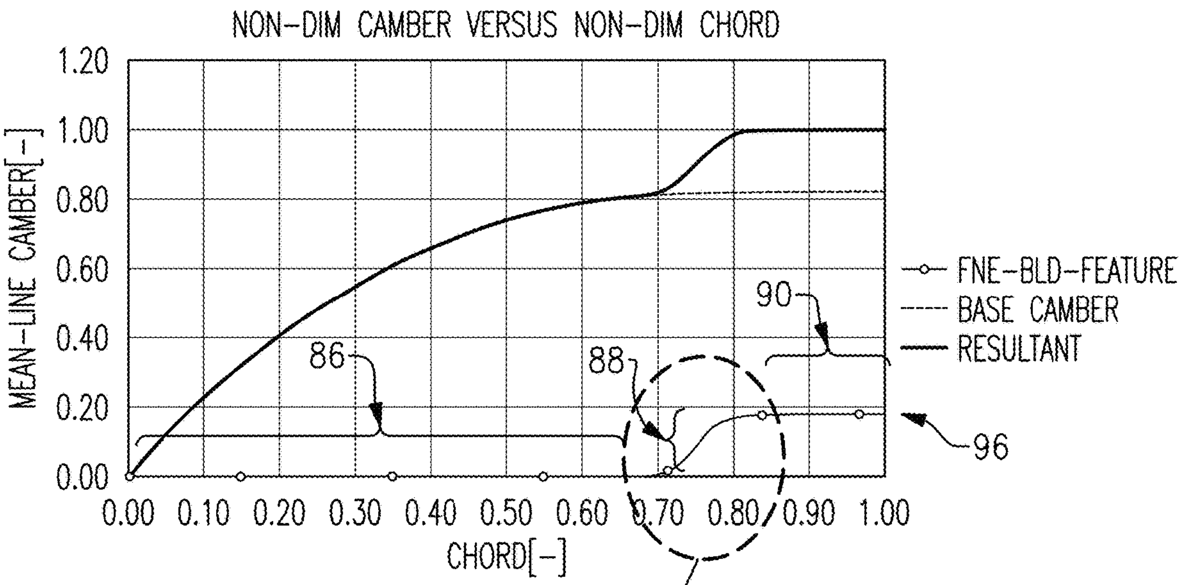
FIG. 5 is a graph illustrating an example camber-angle distribution of an example disclosed airfoil embodiment.

Referring to FIG. 5 with continued reference to FIG. 4, a graph representing camber-angle distribution along the chord 80 of the airfoil 62 is shown. For ease of reference, mathematical equations describing a non-dimensional mean-camber-line (MCL), parameterized in terms of x, y coordinates & the mean-camber-line angle leading-edge (LE) & trailing-edge (TE) values are given as follows.

$$\acute{y}_{MCL} = f\left(\acute{x}_{MCL}\right) \qquad 0 \le \acute{x} \le 1 \tag{E1)}$$

$$\beta_{MCL}\left(\acute{x}_{MCL}\right) = \tan^{-1}\left(\frac{d\acute{y}_{MCL}}{d\acute{x}_{MCL}}\right) \tag{E2)}$$

$$\Delta\beta = \beta_{TE} - \beta_{LE} \tag{E3)}$$

$$\acute{\beta}_{MCL} = \frac{\beta_{MCL} - \beta_{LE}}{\beta_{TE} - \beta_{LE}} = \frac{\beta_{MCL} - \beta_{LE}}{\Delta\beta} \tag{E4)}$$

$$\acute{y}_{MCL} = \int_0^{\acute{x}} \tan\left\{\beta_{LE} + \Delta\beta \cdot \acute{\beta}_{MCL}\right\} d\acute{x} \tag{E5)}$$

E1 describes the y-coordinates of the mean-camber-line as a function of the x-coordinates. The airfoil coordinates are non-dimensionalized by the axial-chord value of the airfoil.

E2 describes the mean-camber-line angle in terms of the derivative of the 'y' coordinates with respect to the 'x' coordinates.

E3 describes the difference between the starting and ending camber-angles at the leading & trailing edges respectively.

E4 describes how the mean-camber-line angle can be non-dimensionalized in terms of the airfoil LE & TE camber angles.

E5 describes how the original mean-camber-line-coordinates, up to an arbitrary scale factor, can be recovered from the non-dimensional mean-camber-line angle distribution and the camber-angles at the airfoil leading & trailing edges.

Figure 6:
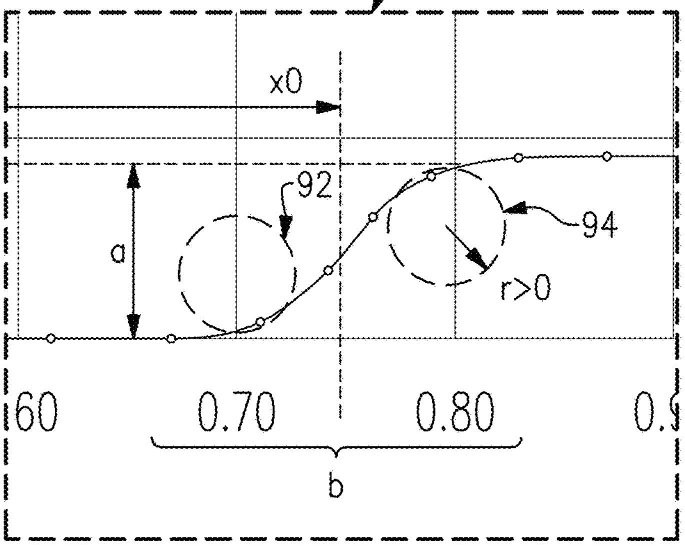
FIG. 6 is a graph illustrating transitions between example camber-angle distributions of an example airfoils embodiment.

Referring to FIG. 6, with continued reference to FIGS. 4 and 5, the non-dimensional mean-camber-line angle distribution can be further decomposed into a traditional camber-angle distribution, and one representative of an FNBD feature. The equations describing this are as follows:

$$\acute{\beta}_{MCL} = \acute{\beta}_{typical} + \acute{\beta}_{FNBD} \tag{E6)}$$

$$\acute{\beta}_{FNBD} = \frac{a\cdot\left(\pi + 2\sin^{-1}\left(\tanh\left[b\cdot\left(\acute{x} - \acute{x}_0\right)\right]\right)\right)}{2\pi} \tag{E7)}$$

-continued $$-1 \le a \le 1$$

$$0 \le x_0' \le 1$$

$$1 \le b \le 1000$$

E6 describes the non-dimensional mean-camber-line angles as a sum of a typical camber-angle distribution and one designed to create an FNBD feature.

E7 describes a parameterized FNBD feature in terms of a camber-angle modification and is parameterized in terms of an amplitude parameter 'a', a chord-wise/arclength-wise position parameter 'x0' and a localization parameter 'b' that controls the chord-wise extent of the FNBD feature either side of the FNBD location 'x0'. The limits on the FNBD parameter values are also given.

The FNBD camber-angle 96 includes a uniform portion 86 that extends from the leading edge 72 to the FNBD feature 76. The FNBD feature 76 includes a rapidly increasing camber-angle 88 followed by a rapidly decreasing camber-angle 90. A first circle 92 and a second circle 94 represent a local limit to the smoothness of the camber-angle distribution at the transition from the uniform camber angle 86 to the increasing camber-angle 88. The second circle 94 represents the transition from the increasing camber-angle 88 to the decreasing camber-angle 90. The radii of the distributions illustrated by the first circle 92 and the second circle 94 of the transition to the increasing camber-angle distribution 88 and from the decreasing camber-angle 90 are finite and do not approach zero.

In one disclosed example embodiment, the rapidly increasing camber-angle 88 is approximately 0.2 non-dimensional camber-angle units higher than the camber-angle provided in the uniform portion 86. In another disclosed example embodiment, the rapidly increasing camber-angle 88 may be located at 0.7 non-dimensional axial-chord/arclength units & extend approximately between 0.66 & 0.84 non-dimensional axial-chord/arclength units.

Figure 7:
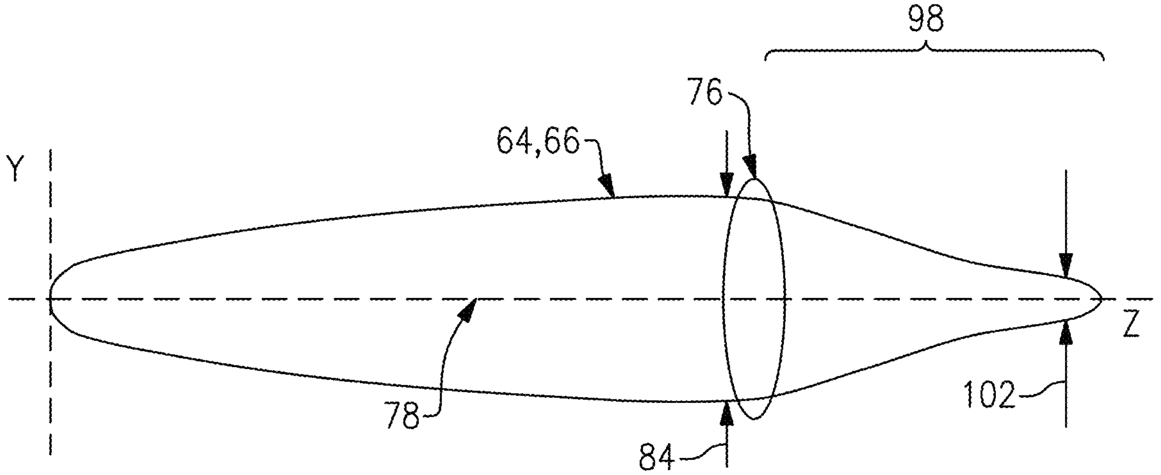
FIG. 7 is a section of an example airfoil transverse to a leading edge according to an example disclosed embodiment.

Referring to FIG. 7 with continued reference to FIG. 4, the airfoil 62 includes a surface 100 that is within a distance 98 aft of the FNBD feature that extends to the trailing edge 74. A thickness in the distance 98 tapers to a minimum thickness 102 such that the surface 100 is substantially flat up to a minimum radius of the trailing edge 74. The distance 98 and trailing edge 74 are thereby shaped to provide a locally increasing boundary-layer edge velocity on the surface 66 that can promote an increase in pressure-surface loading while trimming the thickness 102 to an allowable minimum.

Figure 8:
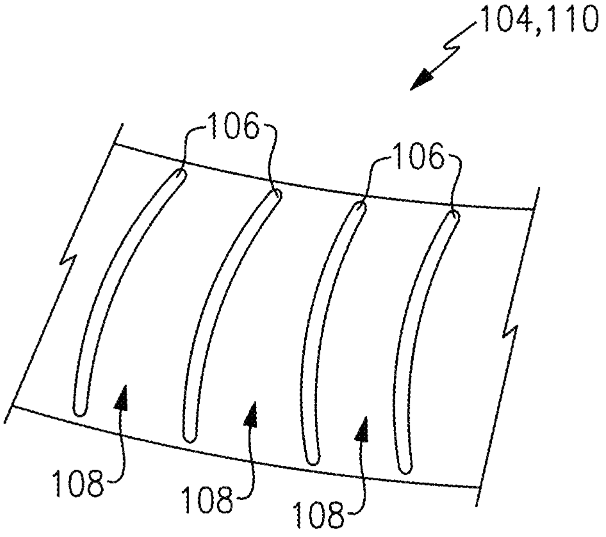
FIG. 8 is a schematic view of a blade row of an example disclosed embodiment.

Referring to FIG. 8 with reference to FIG. 4, in one example embodiment, the airfoil 62 is part of a plurality of blades 106 that are part of a compressor stator 104 or a compressor rotor 110. The blades 106 are separated by a throat area 108. The location of the maximum thickness 84 provided with a rearward placement that is greater than at least 50% of the overall chord length 80 increases a throat margin of a passage 108 between blades. The throat margin is a ratio of the minimum area between the blades 106 and an inlet area. The increase in throat margin provides increased flow capacity, lower flow losses, and an increased incidence range of the airfoil 62. The rearward location of the maximum thickness 84 also provides for a camber angle distribution that results in an increase in pressure surface concave curvature.

Figure 9:
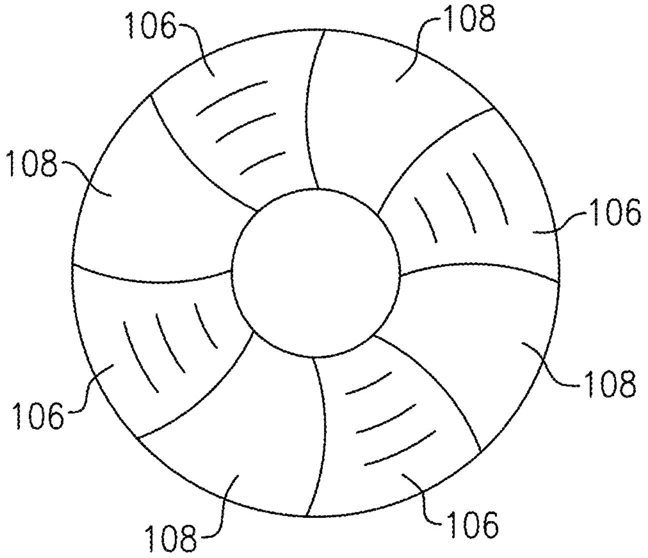
FIG. 9 is a front view of an example compressor stator for an example disclosed embodiment.

Referring to FIG. 9, a schematic front view of a blade row with a plurality of blades 108 that each have an airfoil 62 with the example disclosed camber-angle distribution and profile. The disclosed camber-angle distribution provides for a reduction in blade count for a blade row. In blade count for a blade row is known as solidity.

The reduction in blade count for the blade rows is realized as a reduced solidity that is approximately 0.75 of that which would be required for a blade row including airfoils that do not include the disclosed FNBD feature to exhibit a design-point Diffusion Factor of approximately 0.45. The example disclosed diffusion factor is defined by the Lieblein Diffusion Factor equation.

$$DF = 1 - \frac{V_{x2}}{V_{x1}} \cdot \frac{\cos\beta_2}{\cos\beta_1} + \frac{1}{2\sigma} \cdot \cos\beta_1 \cdot \left(\frac{V_{x2}}{V_{x1}} \cdot \tan\beta_2 - \tan\beta_1\right)$$

The solidity is defined according to the below equation.

$$\sigma = \frac{\text{chord}}{\text{pitch}} = \text{solidity}$$

The beta angles, $\beta_1$ and $\beta_2$ are leading edge and trailing edge values, respectively. The $V_{x1}$ and $V_{x2}$ values are the axial velocity components at the end points, respectively. A solidity value of 0.45 is accepted as a value indicative of a desired blade row configuration.

Accordingly, the disclosed example airfoil embodiments include a camber-angle distribution with a local FNBD feature to induce a localized forced non-equilibrium boundary layer pressure rise to enable improved axial compressor configurations.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An airfoil comprising:

a high-pressure surface and a low-pressure surface extending radially outward from an axis of rotation, wherein the high-pressure surface and the low-pressure surface are connected at a leading edge and a trailing edge and extend from a first end to a second end, a camber line that extends between the leading edge and the trailing edge and a camber angle, which is defined as a plurality of camber-angle distributions extending between the leading edge and the trailing edge, wherein the plurality of camber-angle distributions include a uniform portion that extends from the leading edge to a forced non-equilibrium boundary layer diffusion (FNBD) feature, the uniform portion includes a non-dimensionalized camber-angle unit that is constant, the FNBD feature includes a non-dimensionalized camber-angle unit that is 0.2 higher than the non-dimensionalized camber-angle of the uniform portion, the non-dimensionalized camber-angle units of the uniform portion and the FNBD feature are non-dimensional terms of an axial-chord value of the airfoil, a leading edge camber angle, and a trailing edge camber angle, a thickness between the high-pressure surface and the low-pressure surface is at a maximum at a location greater than 75% of a chord length of the airfoil, and the FNBD feature is disposed at or aft of the location where the thickness is at a maximum.

2. The airfoil as recited in claim 1, wherein a limit to a smoothness of a camber-angle distribution at a transition from the first portion to an increasing camber angle portion and a transition from the increasing camber angle portion to a decreasing camber angle portion are defined as radii that are finite and do not approach zero.

3. The airfoil as recited in claim 2, wherein the increasing camber angle portion is located 0.7 non-dimensional axial-cord/arclength units from the leading edge.

4. The airfoil as recited in claim 2, wherein the increasing camber angle portion is located between 0.66 and 0.84 non-dimensional axial-chord/arclength units from the leading edge.

5. The airfoil as recited in claim 1, wherein the thickness between the high-pressure surface and the low-pressure surface normal to the camber line is symmetrical about the camber line from the leading edge to the FNBD feature.

6. The airfoil as recited in claim 4, wherein the FNBD feature is disposed at or aft of the location where the thickness is at the maximum.

7. The airfoil as recited in claim 1, wherein the FNBD feature is disposed on one of the low-pressure surface and the high-pressure surface.

8. The airfoil as recited in claim 1, wherein the FNBD feature is disposed on the low-pressure surface and a second FNBD feature is disposed on the high-pressure surface.

9. The airfoil as recited in claim 1, wherein the airfoil is part of a compressor rotor blade and/or a compressor stator blade.

10. The airfoil as recited in claim 1, wherein the airfoil is part of a stator of a gas turbine engine.

11. A turbine engine compressor assembly comprising:

a compressor rotor including a plurality of rotor blades; and a stator stage including a plurality of stator blades, wherein the plurality of rotor blades and stator blades are airfoils that extend radially outward from an axis of rotation, wherein at least one of the airfoils comprises a high-pressure surface and a low-pressure surface connected at a leading edge and a trailing edge and extending from a first end to a second end, wherein a camber line extends between the leading edge and the trailing edge and a camber angle is defined as a plurality of camber-angle distributions extending between the leading edge and the trailing edge, the plurality of camber-angle distributions include a first uniform portion that extends from the leading edge to a forced non-equilibrium boundary layer diffusion (FNBD) feature, the first uniform portion includes a non-dimensionalized camber-angle unit that is constant, the FNBD feature includes a camber-angle that is 0.2 non-dimensional camber-angle units higher than the non-dimensionalized camber-angle of the first uniform portion, and a thickness between the high-pressure surface and the low-pressure surface is at a maximum at a location greater than 75% of a chord length of the airfoil and the FNBD feature is located at or aft of the location where the thickness is at the maximum.

12. The turbine engine compressor assembly as recited in claim 11, wherein a thickness between the high-pressure surface and the low-pressure surface normal to the camber line is symmetrical about the camber line from the leading edge to the FNBD feature.

* * * * *